(12) United States Patent
Fratti et al.

(10) Patent No.: US 8,279,731 B2
(45) Date of Patent: Oct. 2, 2012

(54) PREVENTING UNAUTHORIZED USE OF OPTICAL DISCS

(75) Inventors: Roger A. Fratti, Mohnton, PA (US); John A. Michejda, Berkeley Heights, NJ (US)

(73) Assignee: LSI Corporation, Milpitas, CA (US)

( * ) Notice: Subject to any disclaimer, the term of this patent is extended or adjusted under 35 U.S.C. 154(b) by 497 days.

(21) Appl. No.: 12/500,060

(22) Filed: Jul. 9, 2009

(65) Prior Publication Data

US 2011/0007618 A1    Jan. 13, 2011

(51) Int. Cl.
*G11B 19/04* (2006.01)
(52) U.S. Cl. .................. 369/53.21; 369/30.05
(58) Field of Classification Search .......... 369/53.21, 369/30.05, 30.19
See application file for complete search history.

(56) References Cited

U.S. PATENT DOCUMENTS

| | | | |
|---|---|---|---|
| 4,677,604 A | | 6/1987 | Selby, III et al. |
| 4,872,151 A | | 10/1989 | Smith |
| 5,282,187 A | | 1/1994 | Lee |
| 5,288,107 A | | 2/1994 | Johnson et al. |
| 5,489,768 A | | 2/1996 | Brownstein et al. |
| 5,689,484 A | | 11/1997 | Hirasawa |
| 5,694,381 A | * | 12/1997 | Sako ........................ 369/47.12 |
| 5,815,484 A | * | 9/1998 | Smith et al. ................ 369/275.1 |
| 5,822,287 A | * | 10/1998 | Kubota et al. ............. 369/44.38 |
| 6,028,620 A | * | 2/2000 | Yin ............................ 347/252 |
| 6,070,799 A | | 6/2000 | Ashe |
| 6,122,373 A | * | 9/2000 | Gotoh et al. ................... 705/52 |
| 6,295,262 B1 | * | 9/2001 | Kusumoto et al. ........ 369/53.37 |
| 6,493,506 B1 | | 12/2002 | Schoner et al. |
| 6,756,103 B2 | * | 6/2004 | Thompson et al. ........... 428/64.1 |
| 7,016,294 B2 | * | 3/2006 | Blankenbeckler et al. 369/275.3 |
| 7,596,069 B2 | * | 9/2009 | Steenbergen et al. ....... 369/59.23 |
| 2003/0179688 A1 | | 9/2003 | Blankenbeckler et al. |
| 2005/0050343 A1 | | 3/2005 | Selinfreund et al. |

(Continued)

FOREIGN PATENT DOCUMENTS

DE    3842149 A1    6/1990

(Continued)

OTHER PUBLICATIONS

European Search Report and Written Opinion received in EP 10168908.1 (Filed Jul. 8, 2010) received Sep. 22, 2010.

(Continued)

*Primary Examiner* — Adam R Giesy
(74) *Attorney, Agent, or Firm* — Mendelsohn, Drucker & Associates, P.C.; Edward J. Meisarosh; Steve Mendelsohn

(57) ABSTRACT

An optical-disc writer writes extrinsic data to an optical disc. Extrinsic data can be written as (i) embedded marks (e.g., pits and lands) located outside the conventional readable area of a disc and/or (ii) alternative marks, such as surface marks located on a surface of the disc. In an optical-disc player having a disc-reading subsystem and a read controller, the disc-reading subsystem reads and relays the extrinsic data to the read controller, which controls the operations of the player based on the extrinsic data. For example, the writer prints extrinsic data, e.g., a barcode, on the surface of a software installation disc. The disc is inserted in the player and installation is commenced. The read controller instructs the disc-reading subsystem to read the extrinsic information. If the read controller determines that the extrinsic data was successfully read, then installation proceeds; otherwise, installation is halted.

20 Claims, 7 Drawing Sheets

U.S. PATENT DOCUMENTS

| | | |
|---|---|---|
| 2006/0136746 A1* | 6/2006 | Al-Khateeb .................. 713/189 |
| 2007/0025213 A1 | 2/2007 | Morino et al. |
| 2008/0117791 A1* | 5/2008 | Wang et al. ................. 369/275.3 |
| 2009/0097376 A1 | 4/2009 | Yamaoka et al. |
| 2009/0327761 A1 | 12/2009 | Adachi |

FOREIGN PATENT DOCUMENTS

| | | |
|---|---|---|
| EP | 0 523 492 A1 | 1/1993 |
| EP | 0 532 997 A1 | 3/1993 |
| EP | 0940810 A1 | 9/1999 |
| EP | 0971345 A1 | 1/2000 |
| EP | 1879186 A1 | 1/2008 |
| JP | 3-83243 A | 4/1991 |
| JP | 5-258390 A | 10/1993 |
| JP | 09-007288 A | 1/1997 |
| JP | 2006252621 A | 9/2006 |
| JP | 2006309806 A | 11/2006 |
| JP | 2006310967 A | 11/2006 |
| JP | 2007200396 A | 8/2007 |
| WO | WO 93/02450 A1 | 2/1993 |
| WO | WO 2006/064314 A1 | 6/2006 |
| WO | WO 2008/9096420 A1 | 8/2008 |

OTHER PUBLICATIONS

Examination Report; Dated Aug. 25, 2011 for the corresponding EP Application No. 10 168 908.1.

Summons for European Oral Hearing; Mailed May 7, 2012 corresponding to EP Application No. 10168908.1.

* cited by examiner

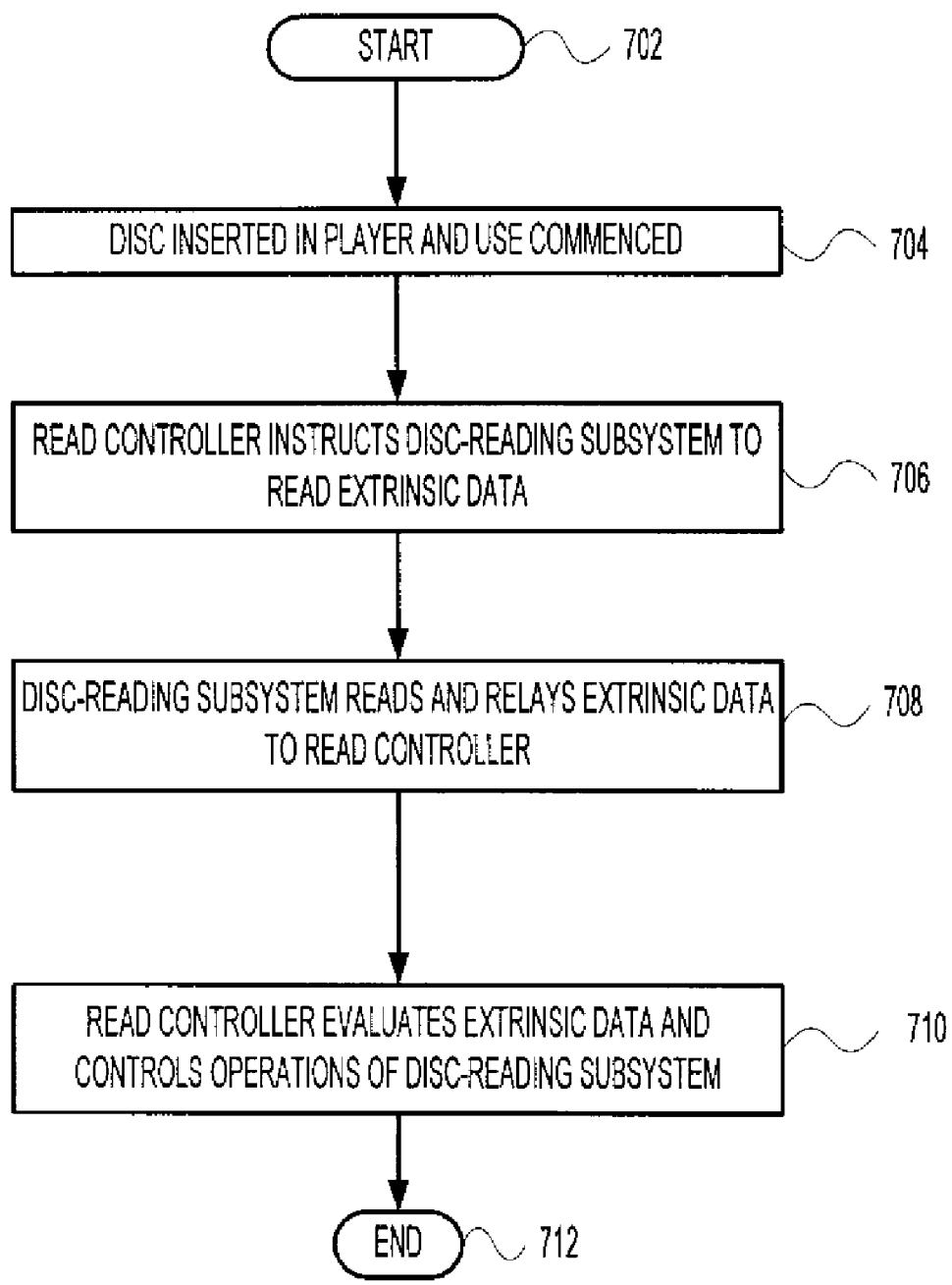

PREVENTING UNAUTHORIZED USE OF OPTICAL DISCS

CROSS-REFERENCE TO RELATED APPLICATIONS

The subject matter of this application is related to the subject matter of U.S. patent application Ser. No. 12/500,089, filed on the same date as this application, the teachings of which are incorporated herein by reference in their entirety.

BACKGROUND OF THE INVENTION

1. Field of the Invention

The invention relates to the writing of information to and the reading of information from optical discs.

2. Description of the Related Art

Optical discs, such as the compact disc (CD) and digital versatile disc (DVD), are an inexpensive and popular medium for the storage and distribution of digital information. Like many digital storage/distribution media, optical discs are susceptible to unauthorized use. For example, a first person purchases a CD containing a computer program and installs the program on a computer, typically an authorized use. However, the first person then gives the disc to a second person, who proceeds to install the program on a second computer, typically an unauthorized use. The author/copyright owner might receive no compensation for the unauthorized use of his or her copyrighted material. Thus, there is an ongoing need for mechanisms that prevent the unauthorized use of optical discs.

SUMMARY OF THE INVENTION

In one embodiment, the invention is an apparatus having an optical-disc player, which optical-disc player comprises a disc-reading subsystem and a read controller. The disc-reading subsystem is adapted to read intrinsic data and extrinsic data from an optical disc, where intrinsic data corresponds to conventional embedded marks on the optical disc and extrinsic data corresponds to at least one of (i) non-conventional embedded marks on the optical disc and (ii) alternative marks on the optical disc. The read controller is adapted to control operations of the disc-reading subsystem based on the extrinsic data.

In another embodiment, the invention is an apparatus having an optical-disc writer, which writer comprises a disc-writing subsystem and a write controller. The disc-writing subsystem is adapted to write extrinsic data to an optical disc, where the extrinsic data corresponds to at least one of (i) non-conventional embedded marks on the optical disc and (ii) alternative marks on the optical disc. The write controller adapted to control operations of the disc-writing subsystem.

In yet another embodiment, the invention is an optical disc comprising (a) conventional embedded marks corresponding to intrinsic data and (b) at least one of (i) non-conventional embedded marks corresponding to extrinsic data and (ii) alternative marks corresponding to extrinsic data, wherein the extrinsic data is used to control operations of an optical-disc player reading the optical disc.

In yet another embodiment, the invention is an optical-disc-writer-implemented method for generating an optical disc having both intrinsic data and extrinsic data. The method comprises (a) the optical-disc writer receiving the extrinsic data and (b) the optical-disc writer generating, on the optical disc, at least one of (i) non-conventional embedded marks corresponding to the extrinsic data and (ii) alternative marks corresponding to the extrinsic data.

In yet another embodiment, the invention is an optical-disc-player-implemented method where the optical-disc player reads extrinsic data from an optical disc, the extrinsic data corresponding to at least one of (i) non-conventional embedded marks on the optical disc and (ii) alternative marks on the optical disc. The optical-disc player controls subsequent use of the optical disc based on the extrinsic data.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

FIG. 7 is a flowchart describing one possible use of player 400 of FIG. 4 according to one embodiment of the present invention.

DETAILED DESCRIPTION

Figure 1:
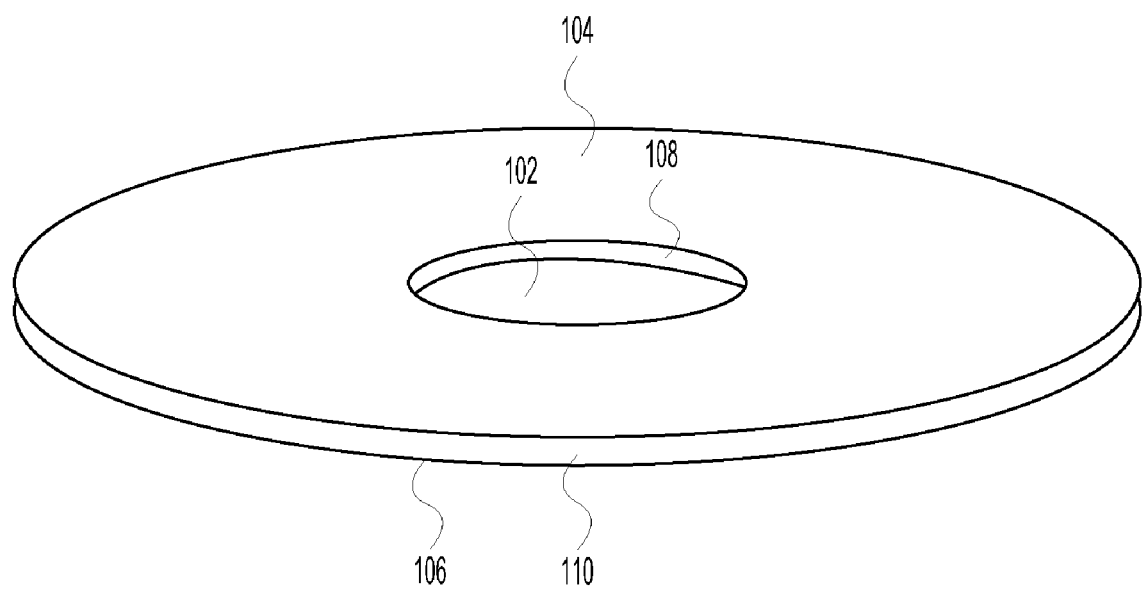
FIG. 1 is a depiction of a typical optical disc 100.

FIG. 1 is a depiction of a typical optical disc 100. Typical optical disc 100 is a flat, circular disc comprising a central spindle hole 102, and four surfaces: upper surface 104, bottom surface 106, inner edge 108, and outer edge 110. The four surfaces, collectively, are referred to herein as the surface of optical disc 100. There are different types of optical discs, e.g., CD, DVD, Blu Ray, each of which has different physical characteristics defined by a specification. For example, the popular compact-disc read-only format (CD-ROM) is defined by ECMA standard 130 "Data interchange on read-only 120 mm optical data disks (CD-ROM)", i.e., ECMA-130, which specification is hereby incorporated by reference in its entirety. ECMA-130 defines a CD-ROM as an optical disc with a thickness of 1.2 millimeters, a radius of 60 millimeters, and a spindle hole that is 15 millimeters in diameter.

Figure 2:
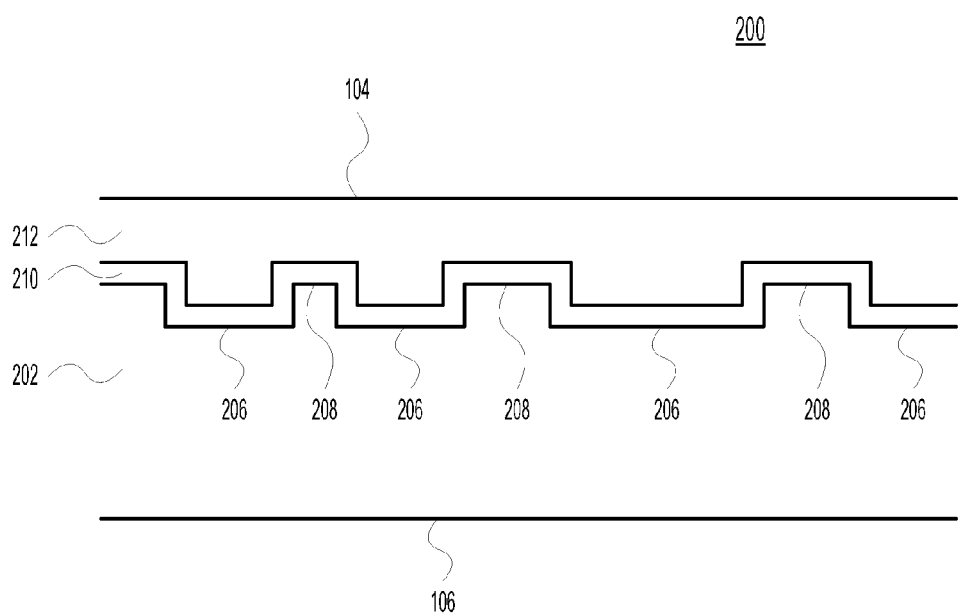
FIG. 2 is a cross-section of a portion of typical optical disc 100.

FIG. 2 is a cross-section of a portion of typical optical disc 100. Optical disc 100 comprises several layers. Bottom-most layer 202 is clear polycarbonate plastic. The bottom surface of layer 202 (i.e., bottom surface 106 of disc 100) is smooth. Layer 210 is a reflective material, typically aluminum. Layer 212 is an acrylic layer that protects reflective layer 210. The top surface of layer 212, (i.e., top surface 104 of disc 100) is smooth.

According to certain embodiments of the present invention, data is written to an optical disc as embedded marks and alternative marks. As shown in FIG. 2, embedded marks refer to pits 208 and lands 206, e.g., etched on or pressed into the top surface of layer 202. The dimensions of the pits and lands depend on the specific optical-disc format. On a CD, pits are 100 nanometers deep, 500 nanometers wide, and a minimum of 850 nanometers long. On a DVD, pits are 120 nanometers deep, 320 nanometers wide, and a minimum of 400 nanometers long. Embedded marks are written to an area of the disc referred to herein as the information area. The dimensions of the information area also vary from format to format. ECMA-130 defines the information area of a CD-ROM as that area having an inner radius of 22 millimeters and an outer radius of 59 millimeters. Embedded marks typically are written to the information area as a single, continuous, spiral track. Data written to the disc as embedded marks is referred to herein as embedded data.

Alternative marks refers to detectable marks, other than embedded marks, made anywhere on an optical disc (e.g., on interior and/or exterior surfaces of the optical disc). Alternative marks might be etched by a laser, written by hand, printed by a printing press, applied in the form of a sticker, etc. Alternative marks might be applied to the exterior surface of the optical disc, i.e., upper surface 104, bottom surface 106, inner edge 108, and/or outer edge 110, or alternative marks might be placed within the optical disc, e.g., printed on the top surface of polycarbonate layer 202 or on the bottom surface of reflective later 210. Data written to the disc as alternative marks is referred to as alternative data.

An optical-disc writer is a system for writing data to an optical disc. A writer can be part of a self-contained device, e.g., a standalone CD burner, or a writer can be a subsystem of a larger system, e.g., a CD burner in a personal or laptop computer.

An optical-disc player is a system for reading and outputting the data stored on an optical disc. A player can be part of a self-contained device, e.g., a standalone DVD player, or a player can be a subsystem of a larger system, e.g., a DVD player in a personal or laptop computer. Typically, a device/system, whether standalone or computer, having a writer will also have a player, although devices/systems with players might not have a writer.

Data on an optical disc is either intrinsic or extrinsic. Intrinsic data comprises embedded data located within the information area of the optical disc (referred to herein as conventional embedded data). Extrinsic data comprises (i) embedded data located outside the information area (referred to herein as non-conventional embedded data) and (ii) alternative data.

Use of an optical disc refers to the accessing of data on the optical disc for a specific purpose. For example, a typical use of a software-installation optical disc is to install a working software program to a computer.

Certain embodiments of the present invention are methods and apparatuses (e.g., writers and players) for writing extrinsic data to and reading extrinsic data from an optical disc to prevent unauthorized use of the optical disc, wherein the extrinsic data is required for the use of the optical disc.

Figure 3:
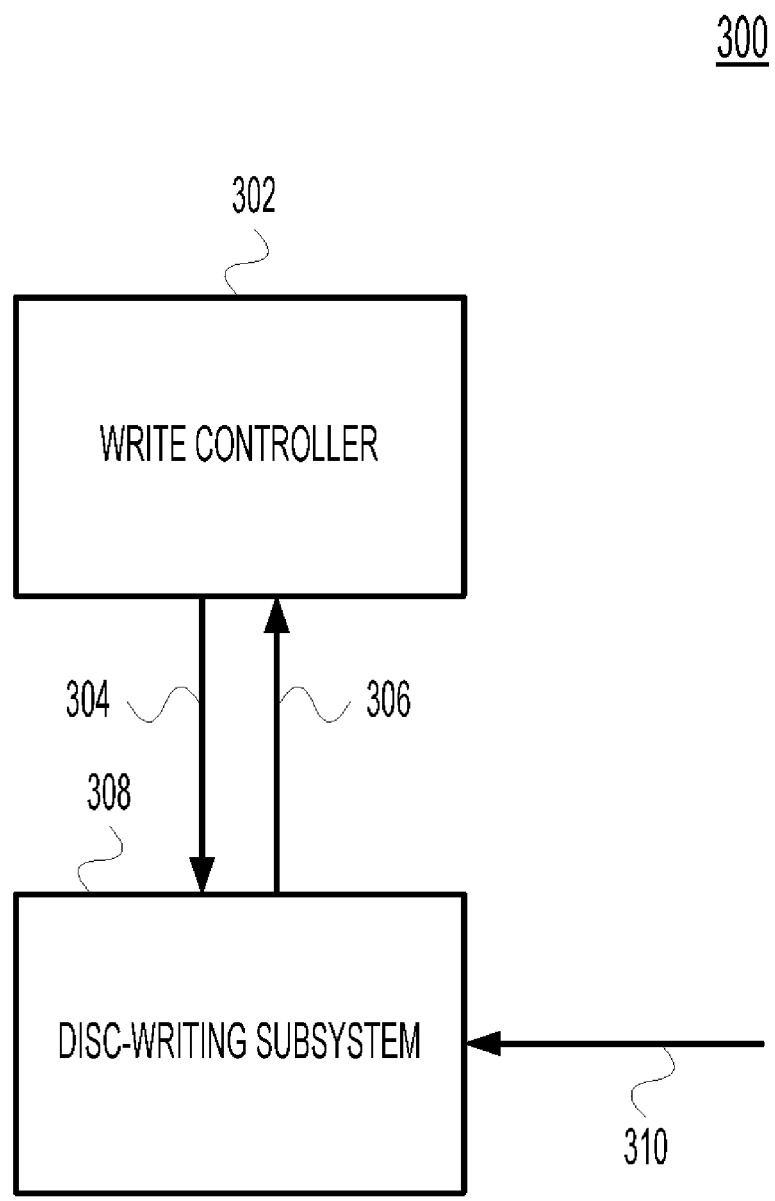
FIG. 3 is a block diagram of an optical-disc writer 300 according to certain embodiments of the present invention.

FIG. 3 is a block diagram of an optical-disc writer 300 according to certain embodiments of the present invention. Writer 300 comprises a write controller 302 and a disc-writing subsystem 308. Write controller 302 controls the operation of disc-writing subsystem 308 via signals 304. The disc-writing subsystem receives data 310 from a source (not shown) and writes data 310 to an optical disc (not shown in FIG. 3, such as optical disc 100 of FIGS. 1 and 2. The disc-writing subsystem also sends signals 306 to the write controller.

The disc-writing subsystem is adapted to write both intrinsic and extrinsic data to the optical disc. The disc-writing subsystem might write extrinsic data to the optical disc in one or more different ways, e.g., burning non-conventional embedded marks with a laser or generating alternative marks. In one embodiment, the disc-writing subsystem is an injection-molding machine for pressing out copies of a master disc with non-conventional embedded marks.

Figure 4:
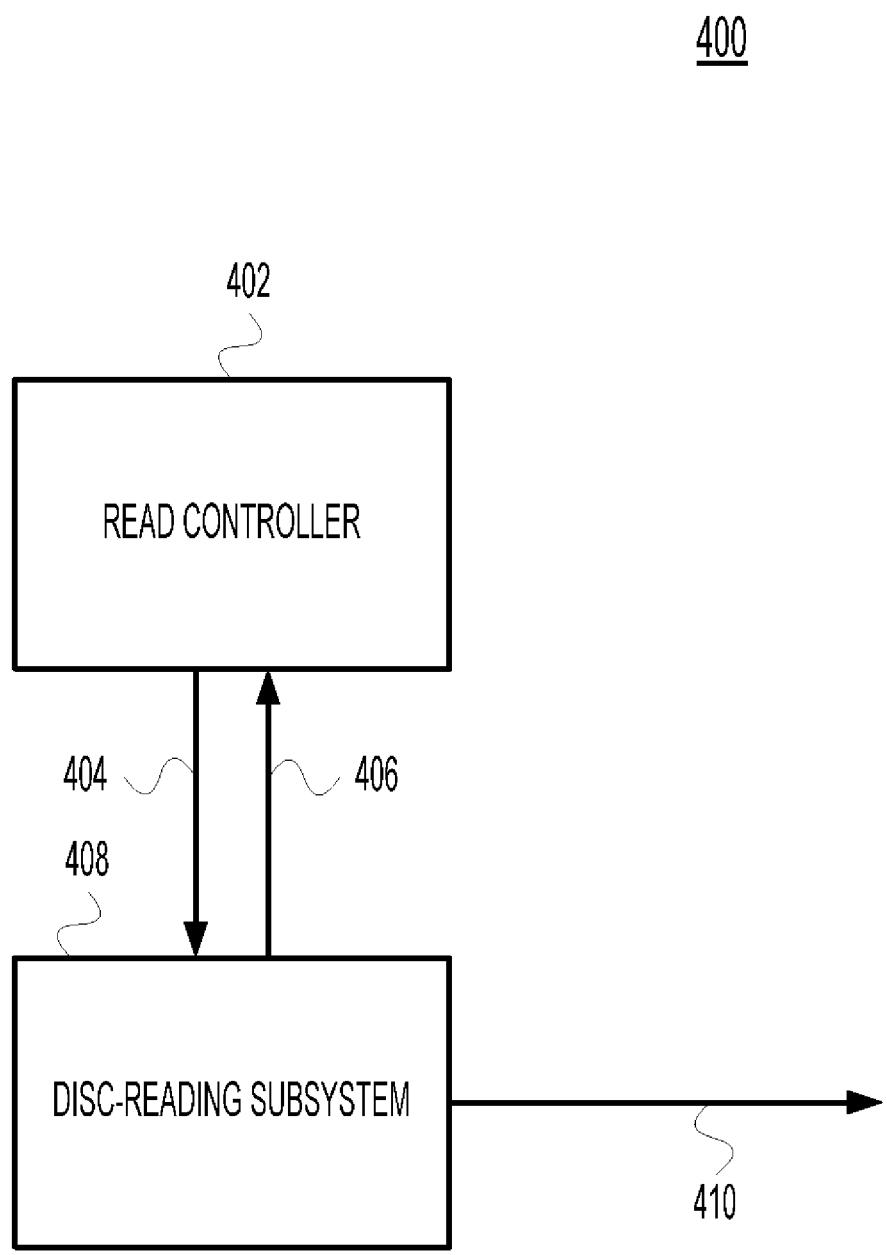
FIG. 4 is a block diagram of an optical-disc player 400 according to certain embodiments of the present invention.

FIG. 4 is a block diagram of an optical-disc player 400 according to certain embodiments of the present invention. The player is adapted to read the intrinsic and extrinsic data of an optical disc. The player comprises read controller 402 and disc-reading subsystem 408.

Disc-reading subsystem 408 reads an optical disc (not shown in FIG. 4) and outputs (i) signal 406 to read controller 402 and (ii) signal 410 to a downstream destination (not shown). Examples of signal 410 would be the video signals outputted by a DVD player, or the data files outputted by a CD player in a personal computer.

Read controller 402 controls the operations of disc-reading subsystem 408 via signals 404. Examples of read controller 402 would be dedicated control circuitry in a standalone DVD player, or the general-purpose processor of a personal computer, which processor is running a music playback program. The read controller might evaluate signals 406 from disc-reading subsystem 408 to determine whether further use of the optical disc is permitted. The read controller communicates its determination via signals 404 to the disc-reading subsystem.

Disc-reading subsystem 408 is adapted to read both intrinsic and extrinsic data. The disc-reading subsystem comprises several major components (not shown in FIG. 4): a drive motor and one or more lens assemblies. The drive motor rotates the optical disc.

In general, a lens assembly detects embedded and/or alternative marks on or within the optical disc. A typical lens assembly comprises (i) one or more light sources (e.g., lasers), (ii) one or more lenses, and (iii) one or more optical sensors (e.g., photodiodes). A lens assembly can be stationary or movable. A movable lens assembly further comprises a tracking mechanism that moves the lens assembly radially (e.g., to follow a spiral track of embedded data on a spinning disc) and vertically (e.g., to focus the lens assembly). Conventional lens assemblies are movable. In certain embodiments of the present invention, a tracking mechanism moves its associated lens assembly to areas outside the information area (e.g., to read non-conventional embedded marks).

To read an optical disc, the drive motor of the disc-reading subsystem 408 spins the optical disc, and keeps the disc spinning for the duration of the read. Movable lens assemblies move to the correct location adjacent to the optical disc for reading the data.

In certain embodiments of the present invention, disc-reading subsystem 408 comprises a lens assembly adapted to read both embedded marks and alternative marks. To read embedded marks, the lens assembly focuses on the pits and lands embedded within the disc. The laser(s) in the lens assembly shoot light at reflective layer 210 of FIG. 2 through clear polycarbonate 202. The reflective layer reflects the light back to the lens assembly. Pits 208 and lands 206 alter the reflected light in different ways. The photodiodes within the lens assembly detect the alterations in the reflected light and output a corresponding electrical signal.

The lens assembly may use a similar process to read alternative marks. Specifically, the laser(s) in the lens assembly shoot light at the alternative marks. The alternative marks alter the reflected light. The photodiodes within the lens assembly detect the alterations in the reflected light and output a corresponding electrical signal.

When reading alternative marks, the lens assembly might use the same focus settings as the focus settings used to read embedded marks. In other embodiments of the present invention, the two focus settings are different. Specifically, when reading alternative marks, the lens assembly is defocused, lowering the resolution of the lens assembly, but also reducing the time required to scan the entire disc. Since alternative marks can be significantly larger than the nanometer-scale embedded marks, the loss of resolution does not affect the accuracy of the scanning of the alternative marks.

In other embodiments of the present invention, a dedicated mechanism for detecting alternative marks (i.e., an alternative-mark detector) is added to the player separate from the lens assembly adapted to read embedded marks.

Figure 5:
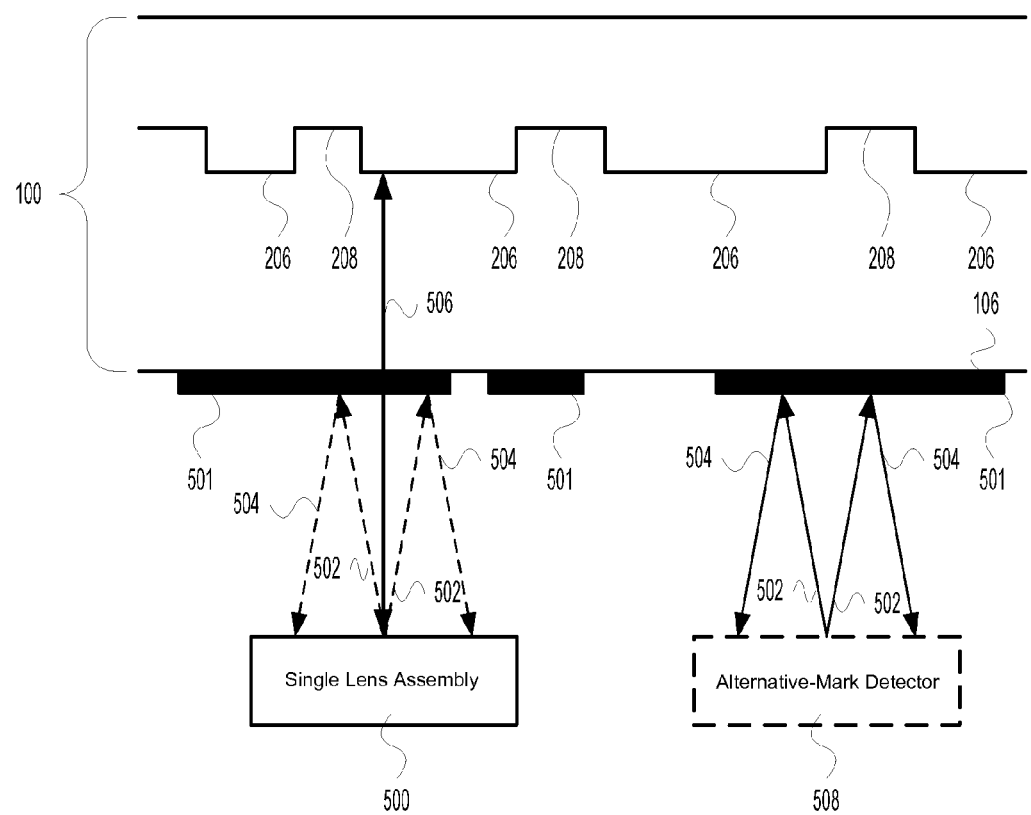
FIG. 5 is a depiction of the reading of embedded data (corresponding to exemplary embedded marks 206 and 208) and the reading of alternative data (corresponding to exemplary alternative marks 501) from disc 100 of FIG. 1 according to several embodiments of the present invention.

FIG. 5 is a depiction of the reading of embedded data (corresponding to exemplary embedded marks 206 and 208) and the reading of alternative data (corresponding to exemplary alternative marks 501) from disc 100 of FIG. 1 according to several embodiments of the present invention. In one embodiment, the reading of both embedded data and alternative data can be performed by a single lens assembly 500. When detecting the embedded marks of an optical disc, the lens assembly emits focused light 506 at embedded marks 206 and 208. When detecting alternative marks, the lens assembly emits defocused light 502 at bottom surface 106 of disc 100, which surface contains alternative marks 501.

In another embodiment, the disc-reading subsystem might contain a separate alternative-mark detector 508 adapted to read only alternative data. The alternative-mark detector, too, emits defocused light 502 at bottom surface 106 of disc 100, which surface contains alternative marks 501.

Depending on the embodiment, lens assembly 500 or alternative-mark detector 508 detects variations in reflected light 504 and send information derived from those variations via signals 406 and/or 410 of FIG. 4.

As shown in FIG. 5, alternative marks 501 can be located, e.g., on surface 106, in locations that correspond to (e.g., in FIG. 5, are directly below) embedded marks 206 and 208. In order to prevent those alternative marks from interfering with the reading of the embedded marks, the alternative marks can be generated using colors that are sufficiently transparent to focused light 506, yet sufficiently reflective for defocused light 502.

Figure 6:
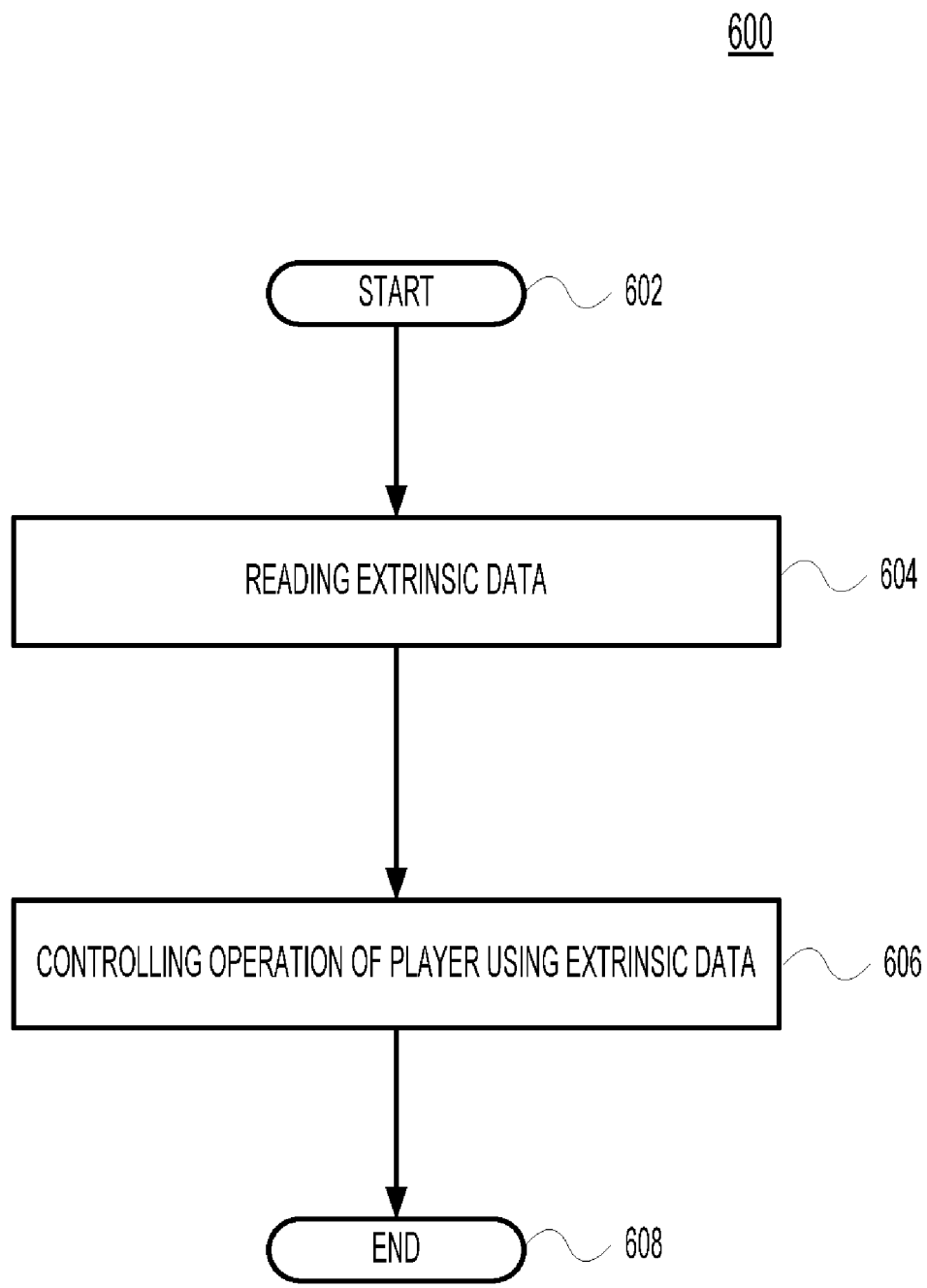
FIG. 6 is a functional flowchart of the read process of player 400 of FIG. 4 according to various embodiments of the present invention.

FIG. 6 is a functional flowchart of the read process of player 400 of FIG. 4 according to various embodiments of the present invention. Processing begins at step 602 and proceeds to step 604 where the player reads extrinsic data from an optical disc. Next, at step 606, the extrinsic data is used to control the operation of the player. Processing then terminates at step 608.

FIG. 7 is a flowchart describing one possible use of player 400 of FIG. 4 according to one embodiment of the present invention. Processing begins at step 702 and proceeds to step 704, where an optical disc is inserted in player 400 and use of the disc is commenced. Next, at step 706, read controller 402 instructs disc-reading subsystem 408 via signals 404 to read the extrinsic data. Next, at step 708, the disc-reading subsystem reads the extrinsic data and outputs the read extrinsic data to the read controller as signals 406. Next, at step 710, the read controller evaluates the extrinsic data and controls the operation of disc-reading subsystem 408 based on that evaluation via signals 404, e.g., the read controller might halt further use of the disc. Processing then terminates at step 712.

For example, assume the optical disc is an installation disc for a software program. The intrinsic data of the installation disc comprises one or more software program files and an install program that installs the software program files to a destination. The extrinsic data is a serial number printed on a surface of the installation disc. Use of the installation disc comprises installing the software program to a destination, e.g., the hard drive of a personal computer (PC). In this example, disc-reading subsystem 408 is part of the PC, and read controller 402 is the general-purpose processor in the PC executing the install program.

Read controller 402 will not install the software program files to the destination unless the read controller can validate the serial number, e.g., determine that the serial number falls within a pre-defined range of valid serial numbers. Thus, the read controller instructs disc-reading subsystem 408 via signal 404 to read the serial number from the disc. If disc-reading subsystem 408 is unable to read the serial number, e.g., the disc drive is a prior-art disc drive incapable of reading extrinsic data, then the read controller will not receive the serial number and, as a result, the read controller will halt further installation of the software. If, instead, the installation disc is read with a player, e.g., player 400 of FIG. 4, according to various embodiments of the present invention, then disc-reading subsystem 408 will be able to read the serial number and relay that serial number directly to the read controller via signals 406. The read controller will then validate the serial number, and instruct disc-reading subsystem 408, via signals 404, to continue with installation of the software program.

Another embodiment would be similar to the example given above, except that the install program is stored in read-only memory (ROM) within player 400. Read controller 402 loads the install program from ROM rather than from the optical disc itself.

Yet other embodiments of the present invention are apparatuses that can both read extrinsic data from, and write extrinsic data to optical discs, e.g., combined players-writers. Yet other embodiments are combined players-writers adapted to make a duplicate of a disc contained extrinsic data, i.e., a disc-duplicator.

Possession of a player adapted to read extrinsic data is a prerequisite for the successful use of an optical disc created according to various embodiments of the present invention. It is expected that the manufacture, sale, and use of writers and players according to various embodiments of the present invention will be carefully controlled, i.e., not mass-manufactured and sold to the general public as is done with conventional disc players, writers, and duplicators.

Limited access to players capable of reading extrinsic data prevents unauthorized use of discs. Only a player capable of reading extrinsic data can use a disc created according to embodiments of the present invention.

It is anticipated that embodiments of the present invention will be used for optical discs containing expensive software. A purchaser of the software will receive both an optical disc containing extrinsic data that controls use of the disc, and a player adapted to read the extrinsic data. When installation is complete, the purchaser returns the player to the software company.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium or loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. Apparatus having an optical-disc player comprising:
    a disc-reading subsystem adapted to read intrinsic data and extrinsic data from an optical disc having a reflective layer embedded between a first clear layer and a second layer, wherein:
        the intrinsic data corresponds to embedded marks of the optical disc;
        the embedded marks are pits and lands defined by the reflective layer;
        the extrinsic data is represented by alternative marks on the optical disc; and
        a first alternative mark is aligned with a first embedded mark such that, when the disc-reading subsystem is at a first reading position for reading the first embedded mark, the first alternative mark is located between the first reading position and the first embedded mark; and
    a read controller adapted to control operations of the disc-reading subsystem based on the extrinsic data.

2. The invention of claim 1, wherein:
    the disc-reading subsystem comprises a single lens assembly;
    the lens assembly is adapted to read, from the first reading position, at a first focus setting, the first embedded mark; and
    the lens assembly is adapted to read, from the first reading position, at a defocused focus setting, the first alternative mark.

3. The invention of claim 1, wherein the disc-reading subsystem shoots light at the alternative marks and detects alterations in the light reflected by the alternative marks.

4. The invention of claim 1, wherein the disc-reading subsystem comprises a lens assembly adapted to read data corresponding to embedded marks and data corresponding to the alternative marks.

5. The invention of claim 4, wherein the lens assembly is further adapted to generate:
    (i) at a first level of optical resolution, a first set of data corresponding to the embedded marks; and
    (ii) at a second level of optical resolution different from the first level, a second set of data corresponding to the alternative marks.

6. The invention of claim 1, wherein the disc-reading subsystem comprises:
    (i) a lens assembly adapted to generate, at a first level of optical resolution, a first set of data corresponding to embedded marks; and
    (ii) an alternative-mark detector, different from the lens assembly, adapted to generate, at a second level of optical resolution different from the first level, a second set of data corresponding to the alternative marks.

7. The invention of claim 1, wherein:
    the read controller is adapted to determine whether the extrinsic data satisfies one or more specified conditions; and
    the read controller is adapted to halt any further use of the optical disc if the read controller determines that the extrinsic data does not satisfy the one or more specified conditions.

8. The invention of claim 7, wherein:
    the optical disc comprises embedded marks corresponding to a software program; and
    the read controller prevents the disc-reading subsystem from reading the software program from the optical disc if the read controller determines that the extrinsic data does not satisfy the one or more specified conditions.

9. The invention of claim 8, wherein:
    the optical disc further comprises embedded marks corresponding to an install program; and
    the read controller is adapted to:
        (1) instruct the disc-reading subsystem to read the install program from the optical disc;
        (2) execute the install program;
        (3) instruct the disc-reading subsystem to read the extrinsic data from the optical disc;
        (4) determine whether the extrinsic data satisfies the one or more specified conditions as part of the execution of the install program; and
        (5) prevent the disc-reading subsystem from reading the software program from the optical disc if the read controller determines that the extrinsic data does not satisfy the one or more specified conditions.

10. The invention of claim 1, wherein the alternative marks are of one or more colors that are sufficiently transparent to focused light yet sufficiently reflective for defocused light.

11. Apparatus having an optical-disc writer comprising:
    a disc-writing subsystem adapted to write extrinsic data to an optical disc, wherein:

the optical disc has a reflective layer embedded between a first clear layer and a second layer;

the reflective layer defines pits and lands, which are embedded marks;

the extrinsic data is represented by alternative marks on the optical disc; and a first alternative mark is aligned with a first embedded mark such that, when an optical-disc reader is at a first reading position for reading the first embedded mark, the first alternative mark is located between the first reading position and the first embedded mark; and a write controller adapted to control operations of the disc-writing subsystem.

12. The invention of claim 11, wherein the disc-writing subsystem is further adapted to write intrinsic data to the optical disc, wherein the intrinsic data corresponds to the embedded mark.

13. The invention of claim 11, wherein the apparatus further has an optical-disc player comprising:

a disc-reading subsystem adapted to read intrinsic data and the extrinsic data from the optical disc, wherein the intrinsic data corresponds to the embedded marks; and a read controller adapted to control operations of the disc-reading subsystem based on the extrinsic data.

14. An optical disc comprising:

a reflective layer embedded between a first clear layer and a second layer;

embedded marks corresponding to intrinsic data, wherein the embedded marks are pits and lands defined by the reflective layer; and alternative marks representing extrinsic data, wherein:

a first alternative mark is aligned with a first embedded mark such that, when an optical-disc reader is at a first reading position for reading the first embedded mark, the first alternative mark is located between the first reading position and the first embedded mark; and the extrinsic data is used to control operations of an optical-disc player reading the optical disc.

15. The invention of claim 14, wherein the optical disc comprises embedded marks corresponding to a software program, such that the extrinsic data prevents the optical-disc player from reading the software program from the optical disc if the optical-disc player determines that the extrinsic data does not satisfy one or more specified conditions.

16. The invention of claim 15, wherein:

the optical disc further comprises embedded marks corresponding to an install program for performing an installation of the software program;

the extrinsic data prevents the optical-disc player from completing the installation of the software program from the optical disc if the optical-disc player (1) reads the install program from the optical disc, (2) executes the install program, (3) reads the extrinsic data from the optical disc, and (4) determines that the extrinsic data does not satisfy the one or more specified conditions.

17. An optical-disc-writer-implemented method for generating an optical disc having both intrinsic data and extrinsic data, the method comprising:

(a) the optical-disc writer receiving the extrinsic data; and (b) the optical-disc writer generating, on the optical disc, alternative marks corresponding to the extrinsic data; wherein:

the intrinsic data corresponds to embedded marks, which are pits and lands defined by a reflective layer embedded between a first clear layer and a second layer of the optical disc; and a first alternative mark is aligned with a first embedded mark such that, when an optical-disc reader is at a first reading position for reading the first embedded mark, the first alternative mark is located between the first reading position and the first embedded mark.

18. The invention of claim 17, further comprising:

(c) the optical-disc writer receiving the intrinsic data; and (d) the optical-disc writer generating, on the optical disc, the corresponding.

19. An optical-disc-player-implemented method comprising:

(a) an optical-disc reader of the optical-disc player reading extrinsic data from an optical disc, the extrinsic data corresponding to alternative marks on the optical disc; and (b) the optical-disc player controlling subsequent use of the optical disc based on the extrinsic data; wherein:

the optical disc comprises intrinsic data corresponding to embedded marks, which are pits and lands defined by a reflective layer embedded between a first clear layer and a second layer of the optical disc; and a first alternative mark is aligned with a first embedded mark such that, when the optical-disc reader is at a first reading position for reading the first embedded mark, the first alternative mark is located between the first reading position and the first embedded mark.

20. The invention of claim 19, further comprising:

(c) the optical-disc reader reading the intrinsic data from the optical disc.

* * * * *